United States Patent [19]
Glancy

[11] 4,365,775
[45] Dec. 28, 1982

[54] COWL STRUCTURE ALIGNMENT AND SHEAR DEVICE

[75] Inventor: Jerry L. Glancy, Wichita, Kans.

[73] Assignee: The Boeing Company, Seattle, Wash.

[21] Appl. No.: 214,185

[22] Filed: Dec. 8, 1980

[51] Int. Cl.³ .............................................. B64D 29/06
[52] U.S. Cl. ................................... 244/53 R; 244/54; 244/129.4; 292/113
[58] Field of Search .................... 244/53 R, 54, 129.4; 292/113, DIG. 40, DIG. 42, DIG. 55, DIG. 73; 60/39.31, 226 R; 248/554

[56] References Cited

U.S. PATENT DOCUMENTS

| 2,695,803 | 11/1954 | Summers | 292/113 |
| 2,712,955 | 7/1955 | Andrews | 292/113 |
| 2,894,777 | 7/1959 | Hogan | 292/113 |
| 3,541,794 | 11/1970 | Johnston et al. | 60/39.31 |
| 4,127,305 | 11/1978 | Nielsen | 292/113 |

Primary Examiner—Charles E. Frankfort
Attorney, Agent, or Firm—Edwin H. Crabtree

[57] ABSTRACT

An improved latch for aligning and securing together a pair of hinged cowlings surrounding an aircraft engine. The latch not only holds the cowlings together during thrust and reverse thrust loads, but also absorbs shear loads placed thereon by the aircraft.

8 Claims, 8 Drawing Figures

COWL STRUCTURE ALIGNMENT AND SHEAR DEVICE

BACKGROUND OF THE INVENTION

The subject invention relates generally to an improved latch and more particularly but not by way of limitation to a latch for aligning and securing together a pair of hinged cowlings surrounding an aircraft engine.

Heretofore, there have beem various types and designs of latches used for securing together hinged cowlings, thrust reverse assemblies, and the like surrounding an aircraft engine. The cowlings are hinged on the aircraft engine so they can be opened for access to the engine and providing maintainence thereon.

Prior art latching devices have generally had separate alignment and shear pins independent of the cowling latch for providing alignment when the hinged cowlings are closed together and absorbing shear loads. This type of structure requires separate installation of the alignment and shear pins at an additional cost and added weight to the aircraft engine. The subject invention solves the above mentioned problems of having separate alignment and shear pins and incoporates this structure into the cowling latch itself.

In U.S. Pat. No. 3,398,535 Campbell et al., U.S. Pat. No. 4,044,973 Moorehead and U.S. Pat. No. 4,055,041 Adamson et al., different types of aircraft nacelle structure and mounting assemblies are disclosed. None of these prior art patents disclosed the unique cowling latch described herein.

SUMMARY OF THE INVENTION

The subject improved latch eliminates the use of separate alignment and shear pins adjacent to the sides of the cowling latch.

The latch is simple in design, rugged in construction, and greatly reduces latch cost when compared to the latches used in the past and the time involved in installing the latches.

The latch itself aids in guiding together the hinged cowlings when slight misalignment occurs. Also, the latch provides a bearing surface to absorb shear loads placed thereon during the operation of the aircraft and in particular in a thrust reverse mode.

The improved latch for aligning and securing together a pair of hinged cowlings surrounding an aircraft engine includes a mounting plate secured to one of the hinged cowlings and having semi-circular beveled sides. A latch keeper eye bolt is secured to the mounting plate and extends outwardly therefrom. A latch housing is secured to the other hinged cowling and includes a mounting plate opening with semi-circular sides dimensioned to receive the latch keeper eye bolt therethrough with the sides of the mounting plate bearing against the sides of the mounting plate opening. The latch housing further includes a latch handle pivotally attached to a latch hook which releasably engages the eye bolt when the cowlings are secured together during the operation of the aircraft.

The advantages and objects of the invention will become evident from the following detailed description of the drawings when read in connection with the accompanying drawings which illustrate preferred embodiments of the invention.

BRIEF DESCRIPTION OF THE DRAWINGS

FIG. 1A is a side view of the jet engine.

DETAILED DESCRIPTION OF THE DRAWINGS

Figure 1:
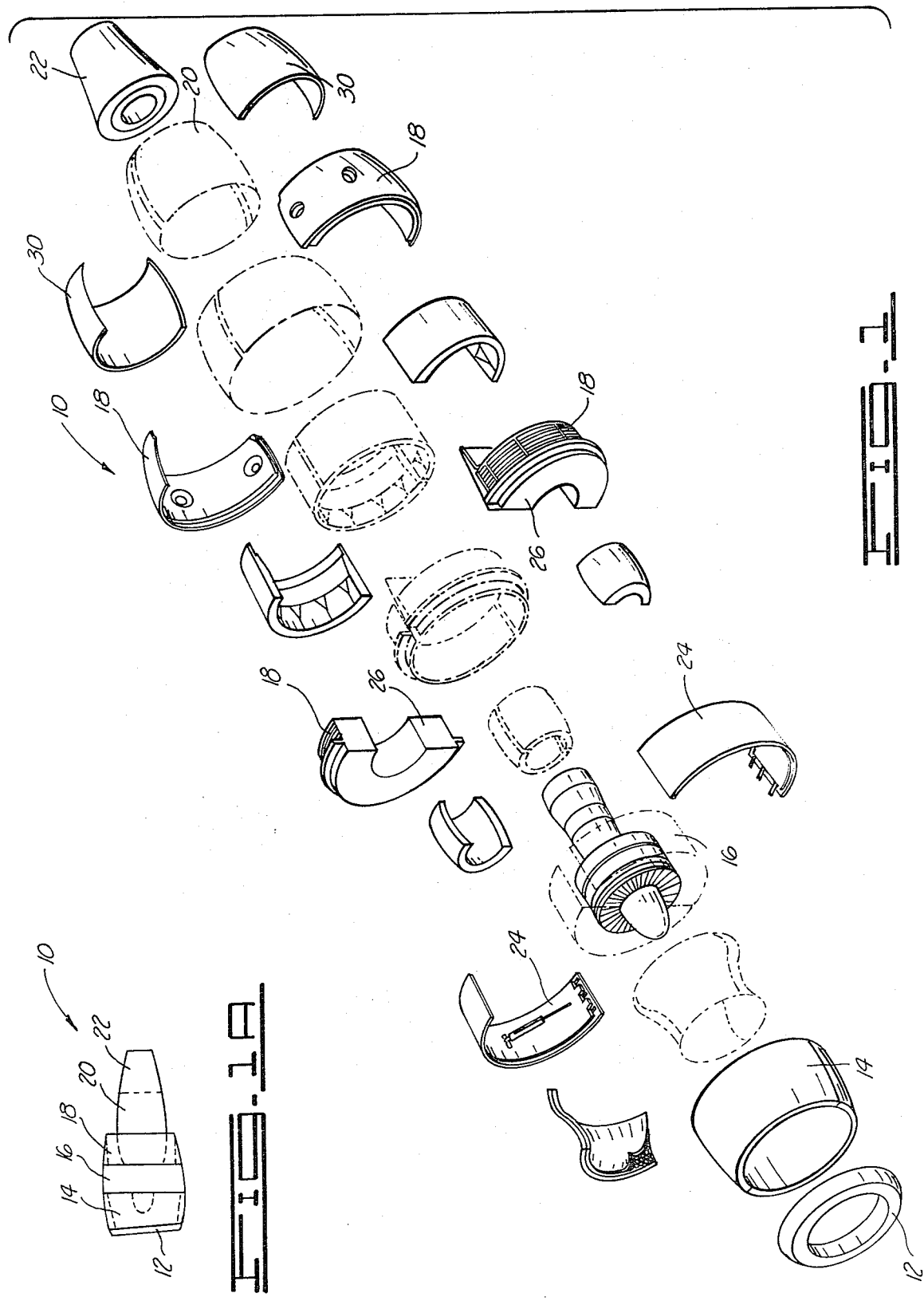
FIG. 1 is an exploded view of a typical aircraft jet engine with hinged cowlings surrounding the engine.

In FIG. 1, an exploded view of the various parts of a jet engine are shown and designated by general reference numeral 10.

In FIG. 1A, a side view of the engine 10 is shown. While the engine 10 is illustrated, it should be appreciated the improved latch as discussed herein can be used equally well for cowlings surrounding a propeller-driven engine, a turbo-prop engine or any other type of engine for driving an aircraft where latches are required to provide access to the internal parts of the engine.

The engine 10 broadly includes a hilite 12, an inlet assembly 14, a fan assembly 16, a thrust-reverse assembly 18, a core assembly 20 and an exhaust 22. In FIG. 1, the fan assembly 16, thrust-reverse assembly 18 and core assembly 20 all include hinged panels. The fan assembly 16 includes a pair of fan cowlings 24 which are secured together at the bottom of the cowlings 24 by the improved latch. The latch is shown and discussed under FIGS. 3 through 7. The thrust-reverse assembly 18 includes a pair of bifurcated structures 26 which are secured together at their bottom by the improved latch. Also, the core assembly 20 includes a pair of core cowlings 30 which again are secured together at their bottom by a plurality of the latches. The remaining parts shown in FIG. 1 of the engine make up the inner and outer panels of the engine 12 along with honey-comb structure having a buried septum therein for attenuating engine noise.

Figure 2:
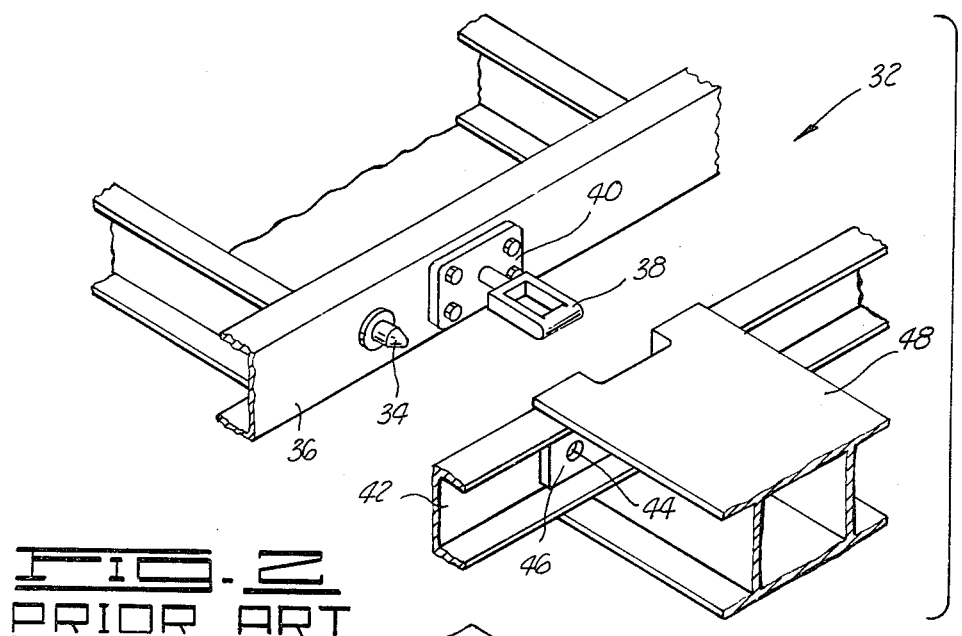
FIG. 2 is a perspective view of a prior art cowling latch with separate locator and shear pin.

In FIG. 2, a prior art latch designated by general reference numeral 32 is shown for securing together a pair of hinged cowlings. The latch 32 includes a separate alignment and shear pin 34 mounted at one end of a hinged cowling 36. Mounted adjacent the alignment and shear pin 34 is a latch keeper eye bolt 38. The bolt 38 is secured to a mounting plate 40. The mounting plate 40 is bolted to the cowling 36.

When the hinged cowling 36 is closed adjacent a second cowling 42, the separate alignment and shear pin 34 acts to align the two cowlings 36 and 42 together with the end of the pin 34 received in a locator hole 44 in a shear block 46 mounted on the cowling 42. The eye bolt 38 is received inside an opening in a latch housing 48 which includes a latch hook and handle. There is no bearing surface in the housing 48 for receiving the mounting plate 40. The latch hook and handle are not shown but it should be understood that the hook releasably engages the eye bolt 38 for securing the cowlings 36 and 42 together. From reviewing this figure, it can be appreciated that two separate installations are required in mounting the eye bolt 38 with mounting plate 40 for receipt in the latch housing 48 and mounting the alignment and shear pin 34 and shear block 46.

Figure 3:
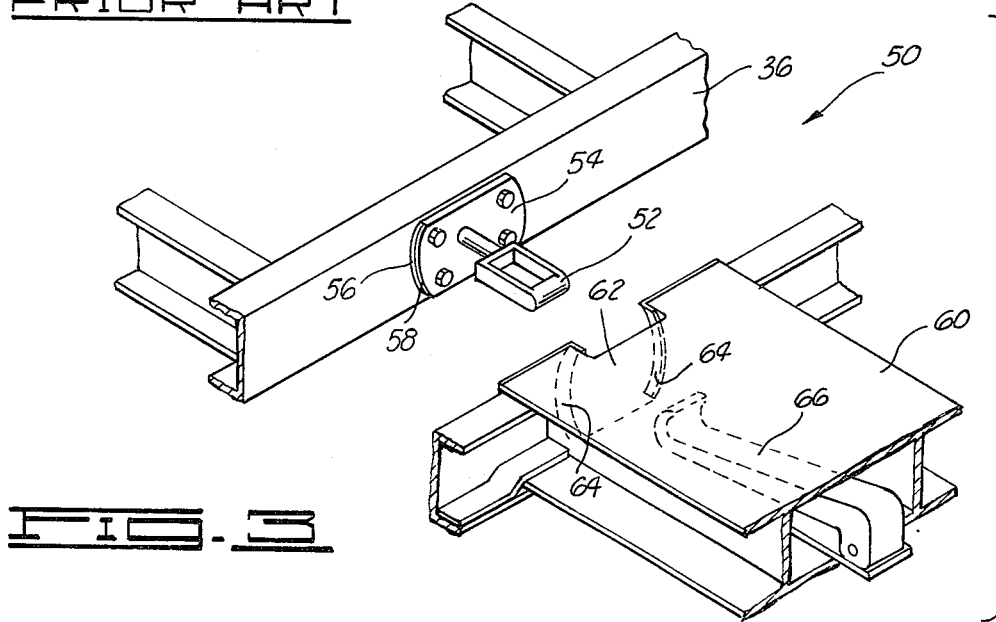
FIG. 3 is a perspective view of the improved cowling latch.

In FIG. 3, the improved latch for securing together a pair of hinged cowlings is designated by general reference numeral 50. The improved latch 50 eliminates the use of a separate alignment and shear pin and incorporates this structure into the latch itself. The improved latch 50 includes a latch keeper eye bolt 52 secured to a mounting plate 54 which is bolted to one end of the cowling 36. The mounting plate 54 is characterized by having semi-circular sides 56 having beveled edges 58. A separate latch housing 60 is mounted in the cowling 42 and includes a mounting plate opening 62 shown in dotted lines. The opening 62 includes semi-circular sides 64 dimensioned to receive the sides 56 of the mounting plate 54 therein. The beveled edges 58 of the sides 56 aid in guiding the mounting plate 54 into the opening 62 when slight misalignment occurs between the two cowlings when they are pivoted into a closed position on the engine. Also shown in FIG. 3 is a latch hook 66 pivotally mounted to a latch handle 68. The hook 66 releasably engages the eye bolt 52 when the eye bolt 52 is received through the opening 62. The handle 68 is pivotly attached to the latch housing 60.

Figure 4:
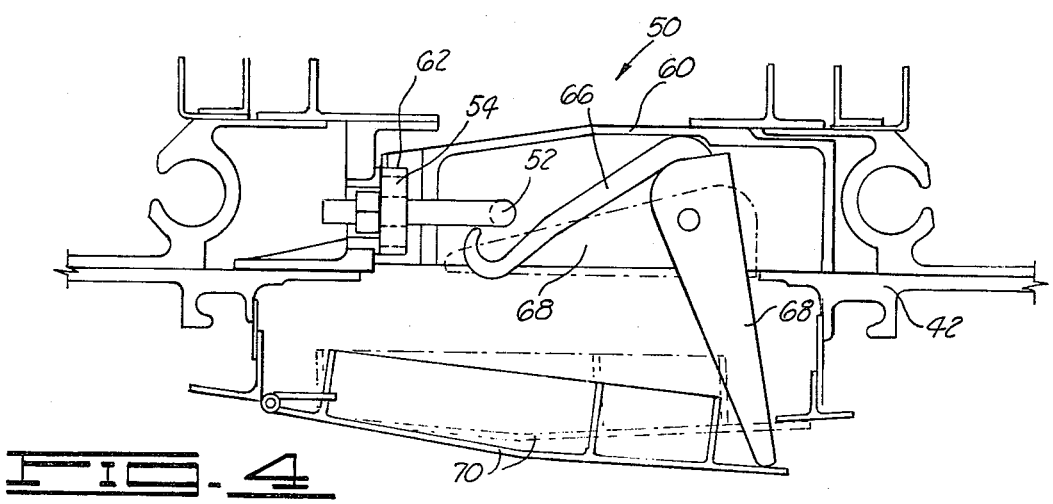
FIG. 4 is a side view of the improved latch in a disengaged position.

In FIG. 4, a side view of the improved latch 50 is seen with the hook 66 disengaged from the eye bolt 52 and the latch handle 68 in a lowered position. In this figure, the cowlings 36 and 42 are shown in a closed position with the mounting plate 54 received inside the opening 62 of the latch housing 60. Also seen in this figure is a louvered door 70 pivotly attached to the cowling 36. It should be noted that as a safety precaution, this door 70 can not be closed until the latch handle 68 is pivoted in a clockwise direction into a closed position with the hook 66 engaging the eye bolt 52 and securing the latch 50. When this has been completed, the louvered door 70 can be moved into a closed position shown in dotted lines.

Figure 5:
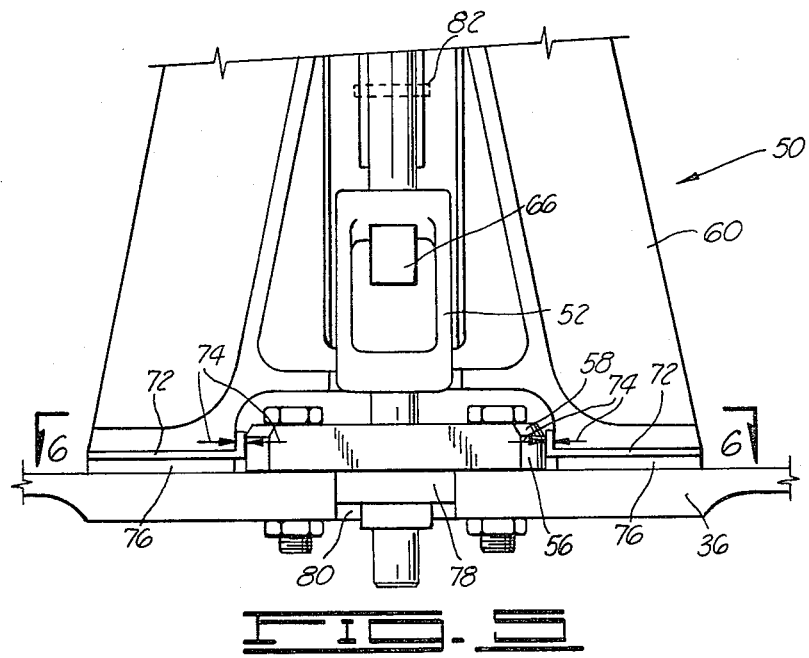
FIG. 5 is a top view of the improved latch in an engaged position.

In FIG. 5, a top view of the improved latch 50 can be seen with the cowlings 36 and 42 in a closed secured position with the hook 66 engaging the eye bolt 52 and the semi-circular sides 56 of the mounting plate 58 received in the opening 62 of the latch housing 60. As an added feature, the opening 62 includes a pair of semi-circular L-shaped bushings 72 surrounding the semi-circular sides 64 of the opening 62 to provide an improved wear surface when the sides 64 of the opening 62 bear against the semi-circular sides 56 of the mounting plate 54 when shear loads indicated by arrows 74 are placed thereon by the aircraft.

It should also be noted that the bushings 72 extend along the front of the housing 60 and mate against laminated shims 76 or compression pads which are used to provide a tight fit when the cowlings 36 and 42 are secured together.

The latch keeper eye bolt 52 and mounting plate 56 also include a circular bearing surface 78 which is received through an aperture 80 in the cowlings 36. This bearing surface 78 acts to distribute shear loads uniformly across the surface of the cowling 36 when these loads are transmitted from the latch housing 60 and mounting plate 54.

Figure 6:
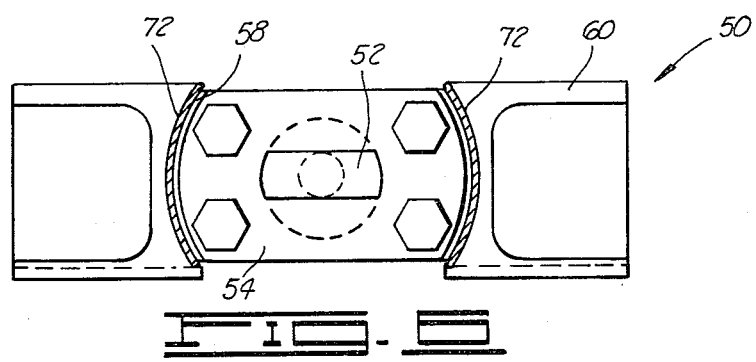
FIG. 6 is an end view of the improved latch in an engaged position and taken along lines 6—6 shown in FIG. 5.
Figure 7:
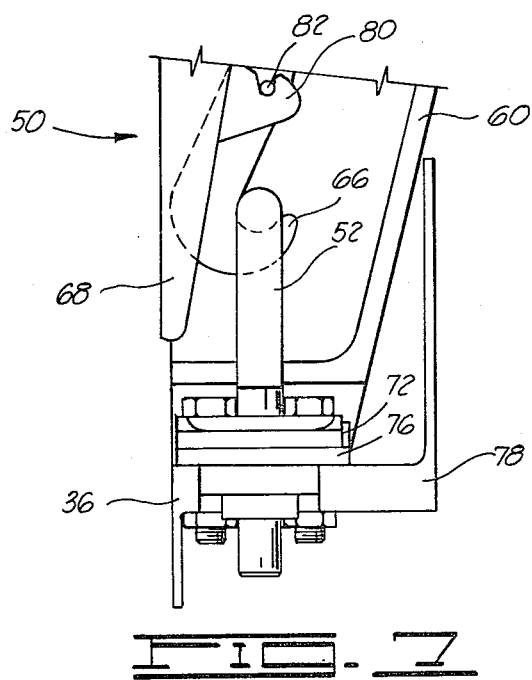
FIG. 7 is a side view of the improved latch in an engaged position.

In FIGS. 6 and 7, an end view and side view of the improved latch 50 can be seen as shown in FIG. 5 with the hook 66 releasably engaged to the eye bolt 52. In FIG. 7, a latch safety catch 80 engages a pin 82 attached to the side of the hook 66. The latch safety catch 80 and pin 82 prevent the hook 66 from becoming disengaged from the eye bolt 52 when the latch handle 68 is in a closed position adjacent the side of the latch housing 60.

Changes may be made in the construction and arrangement of the parts or elements of the embodiments as disclosed herein without departing from the spirit or scope of the invention as defined in the following claims.

I claim:

1. An improved latch for securing together a pair of hinged cowlings surrounding an aircraft engine, the latch comprising:

a mounting plate secured to one of the hinged cowlings;

a latch keeper secured to the mounting plate and extending outwardly therefrom;

a latch housing secured to the other hinged cowling, the latch housing having a mounting plate opening therein, the opening dimensioned so the sides of the opening bear against the sides of the mounting plate when the mounting plate is received therein, the mounting plate opening being sufficient in size to receive the mounting plate therein so the hinged cowlings may be disposed adjacent to each other when in a latched position, the mounting plate having sides with the edge of the sides of the mounting plate beveled for ease in guiding the mounting plate into the mounting plate opening when the hinged cowlings are secured together; and means for releasably engaging the keeper and securing the cowlings together during the operation of the aircraft, the means for releasable engaging the keeper attached to the latch housing.

2. The latch as described in claim 1 wherein the sides of the mounting plate are semi-circular in shape.

3. The latch as described in claim 2 wherein the sides of the mounting plate opening are semi-circular in shape so the sides of the opening mate and bear against the sides of the mounting plate when the mounting plate is received therein.

4. The latch as described in claim 1 wherein the latch keeper is an eye bolt.

5. The latch as described in claim 4 wherein the means for releasably engaging the latch keeper is a latch hook pivotally mounted on the latch housing for releasably engaging the eye bolt.

6. An improved latch for securing together a pair of hinged cowlings surrounding an aircraft engine, the latch comprising:

a mounting plate secured to one of the hinged cowlings;

a latch keeper eye bolt secured to the mounting plate and extending outwardly therefrom;

a latch housing secured to the other hinged cowling, the housing having a mounting plate opening therein, the opening dimensioned so the sides of the opening bear against the sides of the mounting plate when the mounting plate is received therein, the mounting plate opening being sufficient in size to receive the mounting plate therein so the hinged cowlings may be disposed adjacent to each other when in a latched position, the mounting plate having sides with the edge of the sides of the mounting plate beveled for ease in guiding the mounting plate into the mounting plate opening when the hinged cowlings are secured together; and a latch hook pivotally mounted on the latch housing and releasably engaging the latch keeper eye bolt for securing the cowlings together during the operation of the aircraft.

7. The latch as described in claim 6 wherein the sides of the mounting plate and the sides of the mounting plate opening are semi-circular in shape.

8. The latch as described in claim 7 further including a semi-circular bushing attached to the sides of the mounting plate opening for bearing against the sides of the mounting plate.

* * * * *